US006736431B2

(12) United States Patent
Jung et al.

(10) Patent No.: US 6,736,431 B2
(45) Date of Patent: May 18, 2004

(54) HIGH-PRESSURE FUEL ACCUMULATOR

(75) Inventors: Steffen Jung, Leonberg (DE); Heinz Popp, Roitham (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/009,290

(22) PCT Filed: May 3, 2001

(86) PCT No.: PCT/DE01/00823

§ 371 (c)(1), (2), (4) Date: Apr. 18, 2002

(87) PCT Pub. No.: WO01/66934

PCT Pub. Date: Sep. 13, 2001

(65) Prior Publication Data

US 2003/0042735 A1 Mar. 6, 2003

(30) Foreign Application Priority Data

Mar. 6, 2000 (DE) .......................................... 100 10 944

(51) Int. Cl.[7] .......................... F16L 25/00; F02M 55/02

(52) U.S. Cl. ..................... 285/288.1; 285/197; 123/456

(58) Field of Search ................................ 285/197, 189, 285/288.1, 332.2; 123/456

(56) References Cited

U.S. PATENT DOCUMENTS 4,900,180 A * 2/1990 Takikawa ................... 403/233
5,120,084 A * 6/1992 Hashimoto ............. 285/133.11
5,143,410 A * 9/1992 Takikawa .................... 285/197
5,169,182 A * 12/1992 Hashimoto ............... 285/332.2
5,172,939 A * 12/1992 Hashimoto ................... 285/24
5,261,705 A * 11/1993 Takahashi et al. .......... 285/197
5,667,255 A * 9/1997 Kato ....................... 285/133.4
5,887,910 A * 3/1999 Usui ....................... 285/288.1
5,957,507 A * 9/1999 Asada ......................... 285/189
5,979,945 A * 11/1999 Hitachi et al. ........... 285/125.1
6,045,162 A * 4/2000 Haibara ....................... 285/55
6,415,768 B1 * 7/2002 Usui .......................... 123/468
6,463,909 B2 * 10/2002 Asada et al. ................ 123/456

FOREIGN PATENT DOCUMENTS

| | | |
|---|---|---|
| DE | 196 07 521 | 4/1997 |
| EP | 0 751 336 | 1/1997 |
| EP | 0 866 221 | 9/1998 |

* cited by examiner

*Primary Examiner*—Eric K. Nicholson
(74) *Attorney, Agent, or Firm*—Kenyon & Kenyon

(57) ABSTRACT

A high-pressure fuel accumulator for a common-rail fuel injection system of an internal combustion engine has a tubular main body (1) to which is welded at least one bushing (13) for connecting a high-pressure line (6).

Figure 2:
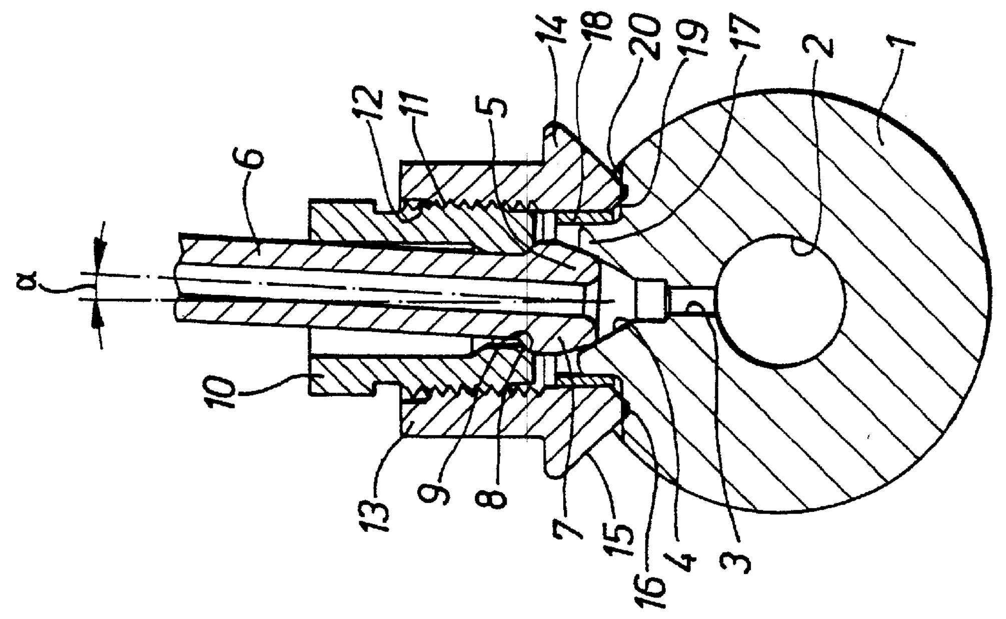

To improve the quality and safety of the high-pressure connections, a collar (14) is formed on the end of the bushing (13) facing the main body (1).

4 Claims, 1 Drawing Sheet

HIGH-PRESSURE FUEL ACCUMULATOR

BACKGROUND INFORMATION

The present invention relates to a high-pressure fuel accumulator for a common-rail fuel injection system of an internal combustion engine, having a tubular main body to which is welded at least one bushing for connecting a high-pressure line.

A high-pressure fuel accumulator of this kind is described, for example, in European Patent Application 866,221 A1. In common-rail injection systems a high-pressure pump, possibly with the assistance of a pre-supply pump, conveys the fuel to be injected from a tank into the central high-pressure fuel accumulator, which is known as the common rail. Fuel lines lead from the rail to the individual injectors associated with the cylinders of the internal combustion engine. The injectors are controlled individually by the engine electronic system as a function of the operating parameters of the internal combustion engine to inject fuel into the combustion chamber of the internal combustion engine.

The object of the present invention is to improve the quality and safety of the high-pressure connections in a high-pressure fuel accumulator of the type described in the preamble. In addition, the high-pressure fuel accumulator according to the present invention should have a simple design and should be inexpensive to manufacture.

This object is achieved with a high-pressure fuel accumulator for a common-rail fuel injection system of an internal combustion engine, having a tubular main body to which is welded at least one bushing for connecting a high-pressure line, by the fact that a collar is formed on the end of the bushing facing the main body.

ADVANTAGES OF THE INVENTION

The collar is used for introducing the welding current required for welding the bushing. In the case of conventional bushings without a collar, the welding electrode is applied to the end of the bushing facing away from the main body. In this case, welding splashes can enter the interior of the bushing and can damage a thread provided there. In addition, the geometry in the interior of the bushing may be deformed in an unwanted manner due to the temperatures that occur in welding. These disadvantages are avoided by providing the collar according to the present invention as a point of action for a welding electrode. Another advantage is that the collar forms a point of action for a force which presses the bushing against the main body during welding. Such a force can practically also be applied with the welding electrode.

A special embodiment of the present invention is characterized in that a bore leads from the interior of the tubular main body, opening into a receiving funnel which widens toward the outside and is used to receive one end of the high-pressure line which is pressed against the receiving funnel by an essentially hollow cylindrical press-screw so that it is tight under high pressure, and the seal is surrounded by an essentially hollow cylindrical insulation ring. An electric shunt is reliably prevented by the insulation ring when welding the bushing. In addition, the insulation ring prevents welding splashes from reaching the seal when welding the bushing.

Another special embodiment of the present invention is characterized in that the insulation ring is premounted in the bushing, and the inner lateral surface of the insulation ring is in contact with the outer lateral surface of a projection in which the receiving funnel is formed. This yields the result that the bushing is centered relative to the projection in assembly before welding.

Another special embodiment of the present invention is characterized in that the end of the high-pressure line is designed in a ball shape, and the inside diameter of the press-screw is larger than the outside diameter of the high-pressure line. This permits a clearance of the high-pressure line relative to the bushing. This yields the advantage that any installation tolerances in the engine compartment can be compensated.

Another special embodiment of the present invention is characterized in that the end face of the bushing which faces the tubular main body is tapered toward the inside. Due to this tapering, access to the connecting point between the bushing and the tubular main body is facilitated.

Additional advantages, features and details of the present invention are derived from the following description, in which two embodiments of the present invention are described in detail with reference to the drawing. The features mentioned in the claims and the description may be essential to the present invention either individually or in any combination.

DRAWING

Figure 1:
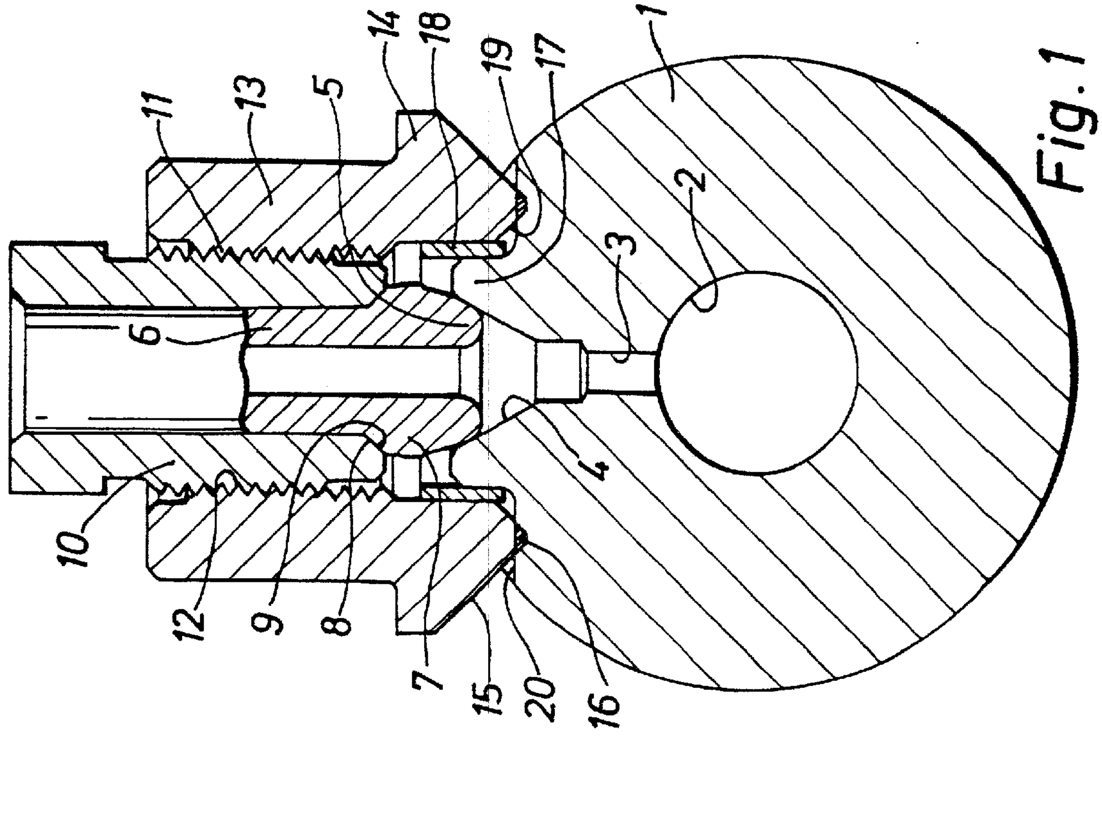

The drawing shows:

FIG. 1 a view of a cross section through a high-pressure fuel accumulator according to a first embodiment of the present invention, and FIG. 2 a view of a cross section through a high-pressure fuel accumulator according to a second embodiment of the present invention.

DESCRIPTION OF EMBODIMENTS

The high-pressure fuel accumulator shown in cross section in FIG. 1 includes a tubular main body 1. A longitudinal bore 2 in tubular main body 1 is used to store the fuel which is under a high pressure. A plurality of transverse bores, only one of which is shown in FIG. 1, namely transverse bore 3, lead away from longitudinal bore 2. Transverse bore 3 opens outward in a receiving funnel 4. Receiving funnel 4 is designed in a conical shape and forms a sealing face for a spherical end 5 of a high-pressure line 6. Spherical end 5 of high-pressure line 6 develops into an area 7 having a widened outside diameter. A pressure shoulder 8 is formed on the outside of high-pressure line 6 following area 7 having a widened outside diameter.

A depression 9, which is formed on the inner circumference of the end of a press-screw facing tubular main body 1, is in contact with pressure shoulder 8 of high-pressure line 6. Press-screw 10 has essentially the shape of a hollow circular cylinder through which high-pressure line 6 passes. Press-screw 10 is provided with an outside thread 11 which interacts with an inside thread 12 formed in a hollow cylindrical bushing 13.

A collar 14 is provided on bushing 13 on the end facing tubular main body 1. A taper 15 is formed on the end face of bushing 13 which faces tubular main body 1. Taper 15 is approximately perpendicular to a depression 19, which is formed on the inner circumference of bushing 13. At the interface between taper 15 and depression 19 there is a peripheral edge which is rounded and sits on a flattened surface 20 which is formed on tubular main body 1. The connection between bushing 13 and tubular main body 1 is formed by a weld 16.

A projection 17 is formed on tubular main body 1 at the center of flattened surface 20. Receiving funnel 4 is arranged at the center of projection 17. On the outside, projection 17 has the shape of a cylinder which is surrounded by an insulation ring 18. The insulation ring has the shape of a hollow circular cylinder which is fitted into bushing 13.

What is claimed is:

1. A high-pressure fuel accumulator for a common-rail fuel injection system of an internal combustion engine, comprising:

a tubular main body;

at least one bushing welded to the main body for connecting a high-pressure line;

a collar situated on an end of the at least one bushing facing the main body;

a receiving funnel, a bore leading from an interior of the main body opening into the receiving funnel, the receiving funnel widening toward an outside and being adapted to receive one end of the high-pressure line;

a substantially hollow cylindrical press-screw pressing the one end of the high-pressure line against the receiving funnel so as to be tight under high pressure; and a substantially hollow cylindrical insulation ring surrounding a seal.

2. The high-pressure fuel accumulator according to claim 1, further comprising a projection in which the receiving funnel is formed, the insulation ring being premounted in the bushing, an inner lateral surface of the insulation ring being in contact with an outer lateral surface of the projection.

3. The high-pressure fuel accumulator according to claim 1, wherein the one end of the high-pressure line has a ball shape, an inside diameter of the press-screw being larger than an outside diameter of the high-pressure line.

4. A high pressure fuel accumulator for a common-rail fuel injection system of an internal combustion engine, comprising:

a tubular main body;

at least one bushing welded to the main body for connecting a high-pressure line; and a collar situated on an end of the at least one bushing facing the main body;

wherein an end face of the bushing which faces the main body is tapered toward an inside.

* * * * *

UNITED STATES PATENT AND TRADEMARK OFFICE
CERTIFICATE OF CORRECTION

PATENT NO. : 6,736,431 B2
DATED : May 18, 2004
INVENTOR(S) : Steffen Jung et al.

It is certified that error appears in the above-identified patent and that said Letters Patent is hereby corrected as shown below:

Title page,
Item [57], ABSTRACT,
Lines 1-4, delete "(1)", "(13)" and "(6)"
Lines 5-7, delete "To improve...main body (1)."

Column 1,
Line 4, change "Background Information" to -- Field of the Invention --
Line 10, insert heading -- Background Information --
Line 11, delete "of this kind"
Line 13, change "866,221 A1." to -- No. 866,221. --
Line 23, insert heading -- Summary of the Invention --
Line 24, change "The object of" to -- An object of --
Line 26, change "fuel accumulator of the type" to -- fuel accumulator. --
Lines 26-27, delete "of the type described in the preamble."
Line 37, delete "Advantages of the Invention"
Line 54, change "A special embodiment" to -- In a special embodiment --
Lines 54-55, delete "is characterized in that"
Line 66, change "Another special embodiment" to -- In another special embodiment --
Lines 66-67, delete "is characterized in that"

Column 2,
Line 6, change "Another special embodiment" to -- In another special embodiment --
Lines 6-7, delete "is characterized in that"
Line 14, change "Another special embodiment" to -- In another special embodiment --
Lines 14-15, delete "is characterized in that"
Lines 19-26, delete "Additional advantages,…any combination."
Line 28, change "Drawing" to -- Brief Description of the Drawings --
Line 29, delete "The drawing shows:"
Line 30, change "Fig.1, a view" to -- Fig. 1 shows a view --
Line 33, change " Fig. 2, a view" to -- Fig. 2 shows a view --

UNITED STATES PATENT AND TRADEMARK OFFICE

CERTIFICATE OF CORRECTION

PATENT NO. : 6,736,431 B2

DATED : May 18, 2004

INVENTOR(S) : Steffen Jung et al.

It is certified that error appears in the above-identified patent and that said Letters Patent is hereby corrected as shown below:

Column 2, (cont.)

Line 38, change "Description of Embodiments" to -- Detailed Description --

Signed and Sealed this

Ninth Day of August, 2005

JON W. DUDAS

*Director of the United States Patent and Trademark Office*